(No Model.) 4 Sheets—Sheet 1.

G. M. BADGER.
COTTON CHOPPER AND CULTIVATOR.

No. 310,636. Patented Jan. 13, 1885.

Witnesses:
R. E. Grant
K. Hunteman

Inventor:
George M. Badger
by Johnson and Johnson
Attys.

(No Model.)  4 Sheets—Sheet 2.

G. M. BADGER.
COTTON CHOPPER AND CULTIVATOR.

No. 310,636.  Patented Jan. 13, 1885.

Witnesses:
G. W. Knotts
R. E. Grant

Inventor:
George M. Badger
by Johnson & Johnson
Att'ys (No Model.) 4 Sheets—Sheet 3.
G. M. BADGER.
COTTON CHOPPER AND CULTIVATOR.
No. 310,636. Patented Jan. 13, 1885.
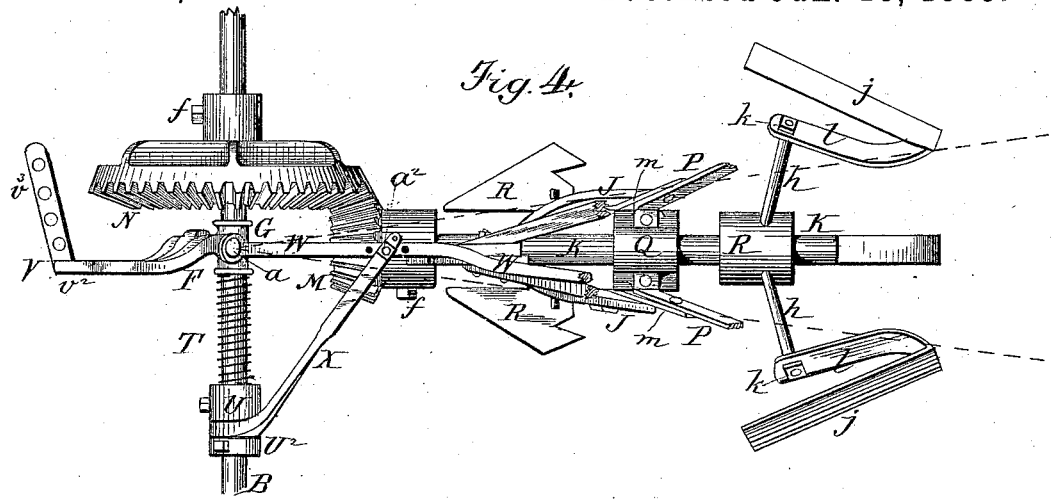
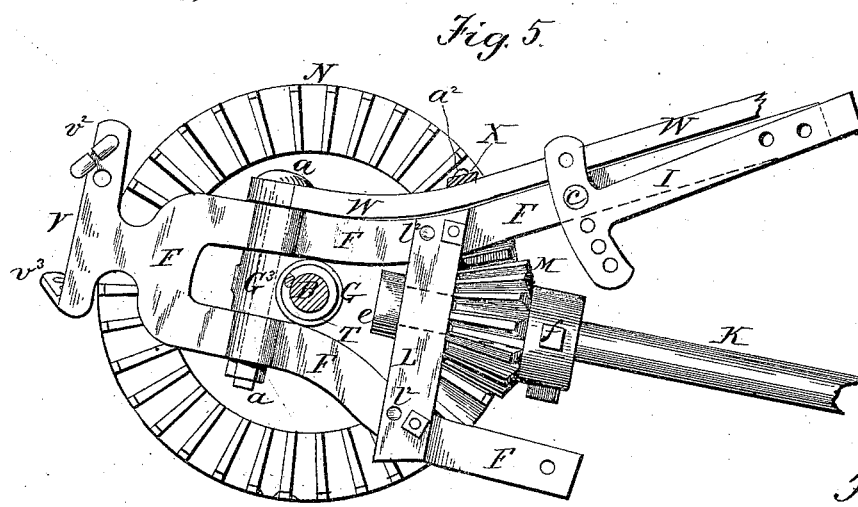
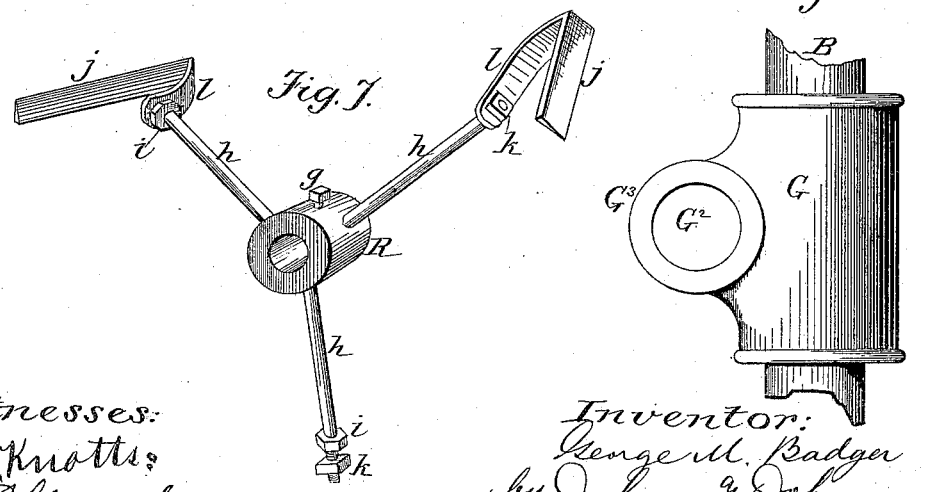
Witnesses:
J. W. Knotts
R. E. Grant
Inventor:
George M. Badger
by Johnson and Johnson
Attys (No Model.) 4 Sheets—Sheet 4.
G. M. BADGER.
COTTON CHOPPER AND CULTIVATOR.
No. 310,636. Patented Jan. 13, 1885.

Witnesses:
G. W. Knotts.
R. E. Grant

Inventor:
George M. Badger
by Johnson and Johnson
Attys.

UNITED STATES PATENT OFFICE.

GEORGE M. BADGER, OF QUITMAN, GEORGIA.

COTTON CHOPPER AND CULTIVATOR.

SPECIFICATION forming part of Letters Patent No. 310,636, dated January 13, 1885.

Application filed August 27, 1884. (No model.)

*To all whom it may concern:*

Be it known that I, GEORGE M. BADGER, a citizen of the United States, residing at Quitman, in the county of Brooks and State of Georgia, have invented new and useful Improvements in Cotton Choppers and Cultivators, of which the following is a specification.

My invention relates to improvements in machines for thinning and cultivating cotton, in which the row of growing plants is thinned by a revolving chopping-hoe so as to leave plants enough for a hill; and the objects of my improvements are to render such machine more effective and of easy control; to provide for a universal-joint coupling of the hoe-shaft and the plow-beams direct with the axle of the supporting-wheels; to provide a draft-clevis attachment direct with the universal-joint coupling, whereby to render the machine compact and easily managed; to provide for throwing the hoe out of gear, and for supporting the hoe and plow attachments upon the cross-bar of the thills when going to and from the field, and to provide a hoe adapted to make a quick and clean cut.

Figure 1:
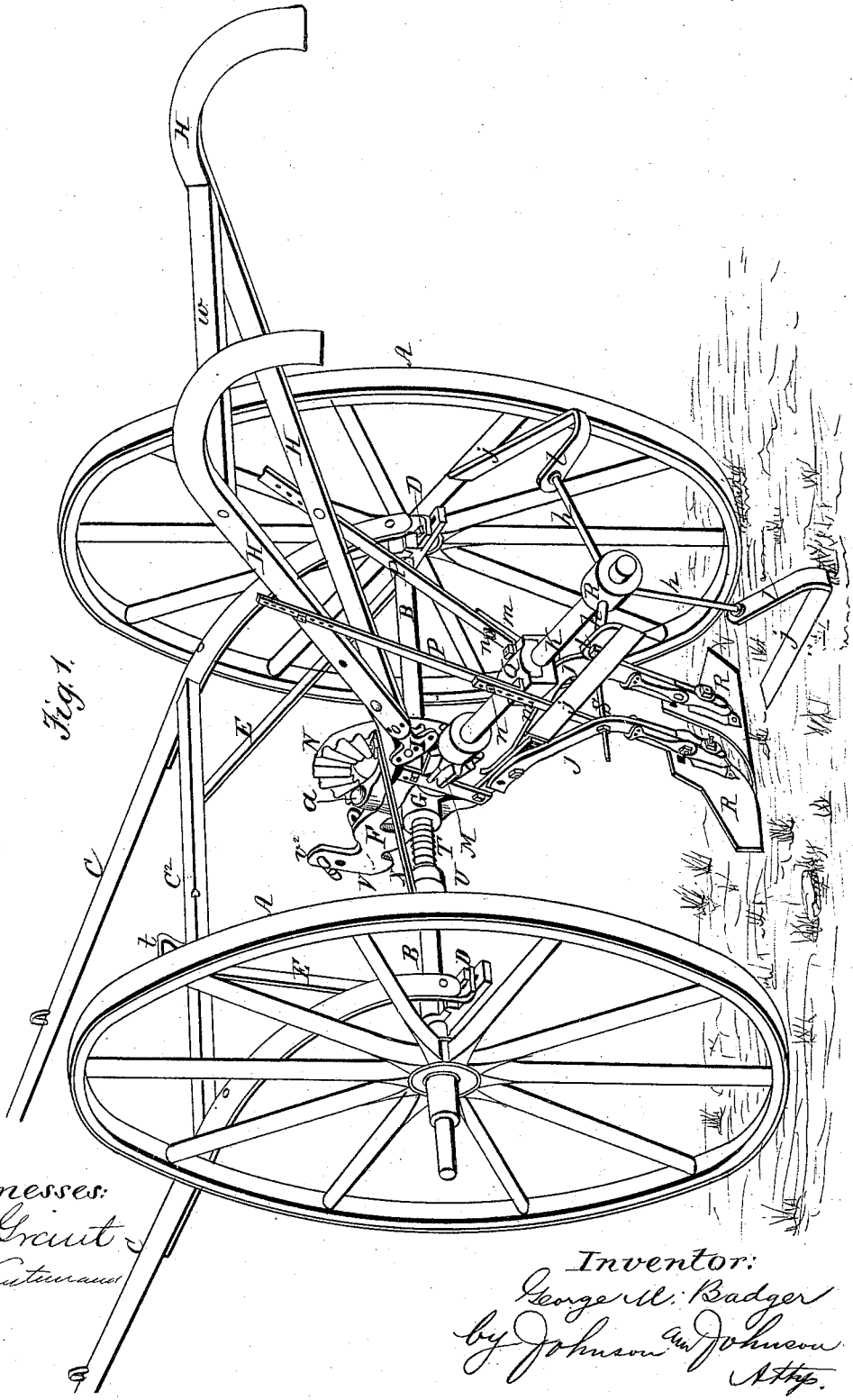
Figure 2:
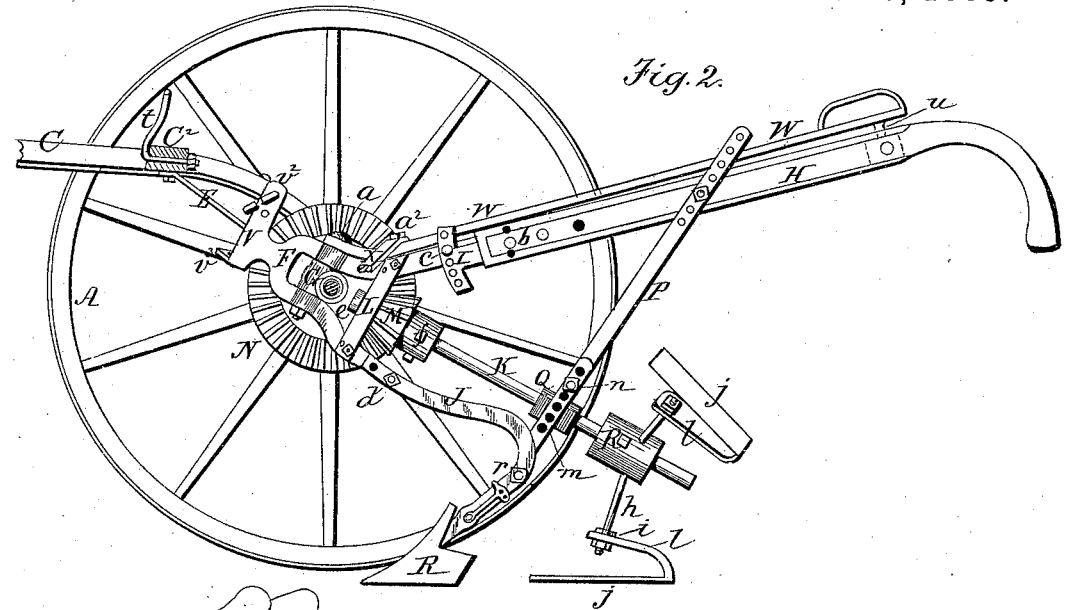
Figure 3:
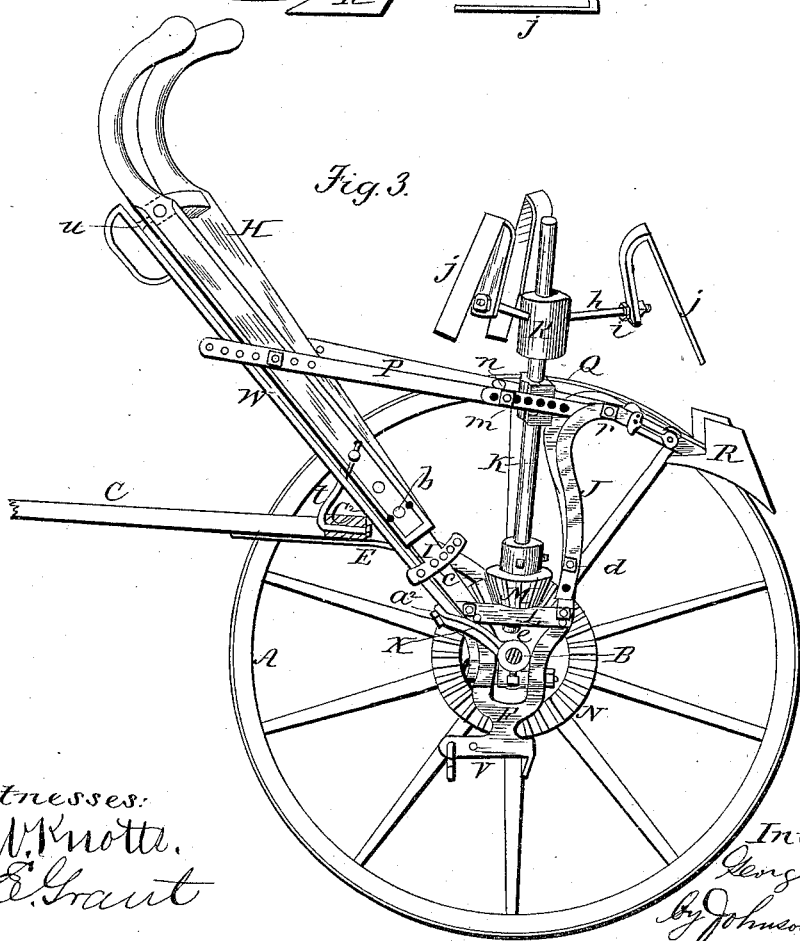
Figure 8:
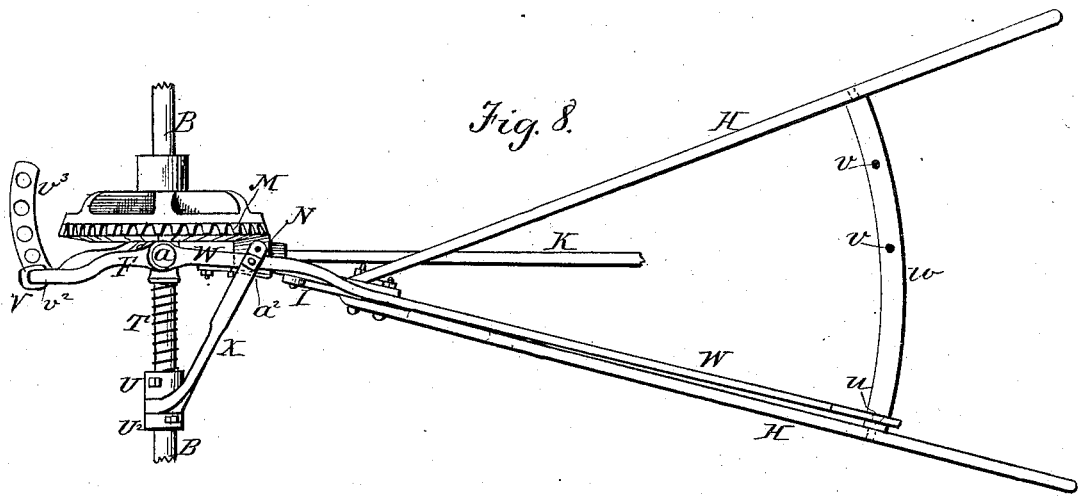
Figure 9:
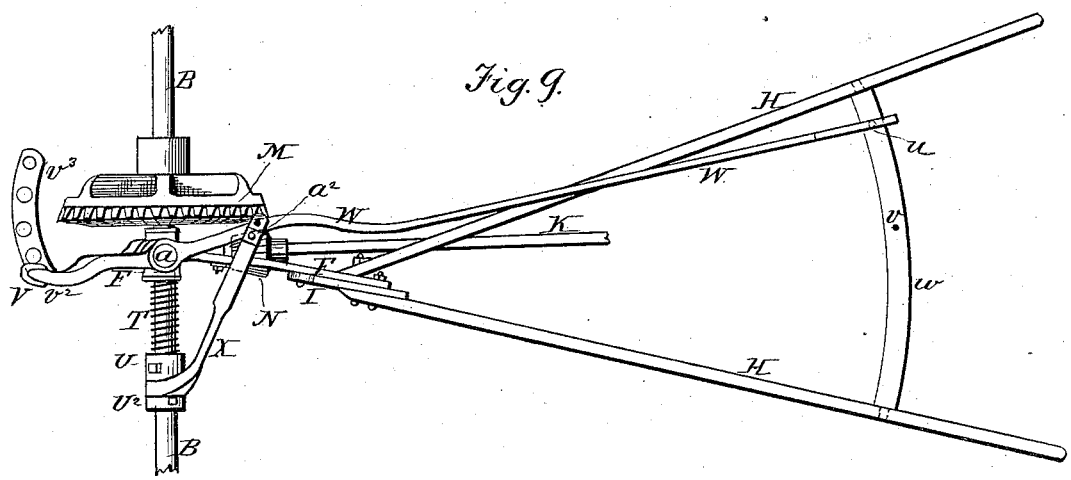

Referring to the accompanying drawings, Figure 1 represents a view in perspective of a machine embracing my improvements; Fig. 2, a vertical sectional elevation; Fig. 3, a similar view, the hoe and plow attachments being shown as turned up and fastened upon the cross-bar of the shafts to carry the machine about when not at work. Fig. 4 represents the revolving hoe-plow attachments and joint-coupling in top view; Fig. 5, the universal-joint coupling-iron and clevis attachment in side view; Fig. 6, the shaft-box of the universal-joint coupling-iron; Fig. 7, a perspective view of the hoe; Fig. 8, a top view of the handles and their attachments with the universal-joint coupling of the shaft, the hoe-shaft pinion being in gear; Fig. 9, the same parts in plan, showing the hoe-shaft pinion out of gear.

The machine is supported upon two wheels, A A, one or both of which are secured to and revolve the axle B, which is about an inch round iron, four feet long, the wheels being about three feet in diameter, with iron hubs secured by binding-screws to the axle.

The machine is guided by thills or shafts C, which are attached to the axle by boxes D D, to which the thill-irons are bolted in rear or in front of the axle. The thill-irons may have their ends bent parallel with the axle, and the boxes may have slots to allow the thill-irons to be set upon the boxes, so as to permit of the bolting of braces E E to the under side of the cross-bar of the thills, and to the boxes to securely brace the thills to the axle.

The plowing or siding and hoeing devices are connected directly to the axle by a bent or branched iron strap, F, which forms with a box, G, loosely mounted on the axle, the universal-joint coupling, upon which the attachments can be moved sidewise to the right or to the left to follow the line of the plants, and be turned up upon the thills when not at work.

The box G is of the form of what is known as the "T-coupling," being pierced with a hole, $G^2$, Fig. 6, by which it is fitted upon the axle, and having a right-angled hole in the T projection $G^3$, which stands in front of the axle, to which the bent strap F is pivoted in front of the axle, as shown in Fig. 5, the branches of the strap being pierced with coincident holes, through which a bolt, $a$, passes vertically to secure the strap to the box, so that one of the branches of the strap will be above and one below the axle, with their ends extending behind the latter. Upon this bolt $a$ the bent strap is free to be moved, as upon a pivot, to allow its branches to have sidewise movement, while the box is also free to have a sliding movement upon the shaft.

To that branch of the strap F which extends above the axle the handles H H of the hoe and plow attachments are secured by a bolt, $b$, which serves as a pivot, and by an iron T-shaped plate, I, which, by holes in its T end and a bolt, $c$, allows the handle ends to be set higher or lower, as may be found most suited to the plowman. (See Fig. 5.)

To that branch of the strap F which extends below the axle the plow-beams J J are secured by a bolt, $d$, which serves also as a pivot. The hoe-shaft K extends horizontally between these strap-branches, and has a bearing in a strap-box, L, bolted in vertical position across and to these strap-branches in rear of the axle. The inner end of this hoe-shaft has a shoulder or head, *e*, which works against the strap-box L, between the latter and the axle-box G, to hold the shaft from endwise movement. The hoes are carried upon the rear end of this shaft in rear of the plows and revolved by a bevel-pinion, M, meshing with a bevel-gear, N, on the axle, so that the hoe-shaft is driven by direct gear-connection with the axle, which gives the important advantage of shortening up the working attachments of the machine. The pinion M and the bevel-gear N are secured by set-screw bolts *f*, so that the pinion can be removed and replaced by a larger one to speed the chopper, as may be desired. The hoe end of the shaft K is suspended from the handles by suspension-bars P P and a bearing-box, Q, the bars being bolted to the ends of the box and adjustably connected to the handles, which allows the hoe-shaft to be set higher or lower in relation to the handles.

The hoe consists of a hub, R, having a hole and a binding-screw, *g*, by which it is fitted and secured upon its shaft, and spokes *h*, screwed into the hub, each having a collar, *i*, and a screw cut upon its outer end, and a hoe-blade, *j*, clamped by a nut, *k*, against the collar. The hoe-blades are straight and stand at an angle with the axle, and each has a bent shank, *l*, curving over from one end of the blade, somewhat like the letter V, with a short leg. The blade *j*, being narrow and standing away from the spoke, acts to cut across the row and clip out a bunch of plants without raising or throwing dirt, (as is done when the spokes or arms enter the dirt with the hoes,) so that the plowman can see the work of the hoes, and the latter will be kept from clogging. The plows R R are right and left, and set so as to work on each side of the row and throw dirt from it in what is called "siding" the plant, while the hoes do the thinning. The plows are of the usual mold-board form for the purpose, and may be attached to the beams in any suitable way. The beams J J are suspended from the hoe-shaft suspension-bars P by short bars *m*, connected to said bars P by bolts *n*, which may be set in holes in said bars *m*, to adjust the height of the plows in relation to the depth of cut of the hoes, the plows being set to work below the cut of the hoes. The space between the plows is adjusted and the plow-beams are held rigidly together by a screw-rod, S, passing horizontally through the rear curved ends of the beams, and nuts *r*, on each side of said beams, and thereby allow the plows to run as close as required to the sides of the row of plants. This rod S also serves to connect the short suspension-bars *m* to the beams.

In connection with the axle-joint coupling of the hoe and plow attachments, provision is made for holding the pinion M in gear, while permitting the moving of the hoe and plow attachments laterally for the purpose stated.

This provision consists of a spring, T, placed on the axle between a collar, U, set thereon, and the coupling-box G, so as to press the bent coupling-strap F, which is jointed to the axle-box, toward the axle-gear N, and thus keep the pinion M in gear while moving the hoe and plow sidewise to conform to the line of plants. This provision also allows the hoe to be thrown out of gear when turned up and secured upon the thills, as will be presently described. The horse draws directly upon the coupling-strap iron F, and while the latter serves to carry the hoe-shaft and the plow-beams, it also serves as the clevis to which the single-tree is attached. The clevis V is made L-shaped, forming a horizontal and a vertical branch, each having holes in which to make the attachment to regulate the draft. It is preferably integral with the coupling-strap iron F; but it may be separate and attached to the coupling-iron, so that the point of draft is by direct connection with the universal-joint coupling. In this connection it is important to notice that the thills, by means of their box-couplings with the axle, can rise and fall without affecting the draft of the clevis, and that the thills merely serve to guide the machine. The universal-joint coupling being direct upon the axle, the handles of the hoe and plow attachments can be turned up and supported upon the cross-bar $C^2$ of the thills and fastened by a hook, *t*, when the machine is not in use, as shown in Fig. 3. In this case the hoe-shaft must be thrown out of gear; otherwise it would have to be held up by the plowman or removed from the machine, because it could not be turned up and kept from revolving the hoes. The provision for throwing the hoe-shaft out of gear consists of a lever, W, extending along the top of the handles, pivoted by the bolt *a* of the universal coupling upon the coupling-iron F, and connected by an arm, X, to the axle between the fixed collars U $U^2$ thereon, so that this arm forms a fulcrum, $a^2$, upon which the lever W is moved to throw the pinion out of gear. This is done by moving the handle end of the lever to the right and fastening it by a pin, *u*, in a hole, *v*, in the cross-bar *w* of the handles. This movement of the lever slides the coupling-iron F and the axle-box against the pressure of the spring T and carries the pinion away from the bevel-gear, because the pinion-shaft is carried by said coupling-iron. Upon releasing the lever by withdrawing its pin *u* from the handle-bar, the spring T forces the coupling-iron again in position to engage the pinion. The box-strap L of the pinion-shaft has holes $l^2$ for proper adjustment, and the plow-beams are adjustable upon the coupling-iron, while the hoe-hub is made adjustable upon its shaft to set the hoes nearer to or farther from the plows, and to remove the hoes should it be desired to work with the cultivator-plows only.

The coupling of the hoe and plow attachments directly upon the axle, with the coupling-pin arranged in front of the axle, gives the advantage of compactness and greatly relieves the labor of the plowman. The arrangement of the hoe-shaft bearing in the coupling-iron, independent of the draft of the plow-beams, relieves the hoe-shaft from such draft and from the friction which would result if the force of the draft of the plows was borne by the shouldered end of the hoe-shaft.

By my improvement the draft of the plows is upon the coupling-pin $a$, and there is no end draft upon the hoe-shaft bearing-collar. The horse walks on the right-hand side of the row, and the joint connection or box G is fixed on the shaft to one side of the middle of the length of the axle between the wheels. The clevis V is made L-shaped, so that when the machine is used for cultivating growing plants the hoe is removed and the single-tree is attached to the vertical branch $v^2$, and when chopping with the hoe the attachment is made with the horizontal branch $v^3$ of the clevis to equalize the strain on the plowman produced by the force of the spring in moving the handles to the right or to the left.

I claim—

1. The combination, with the hoe-shaft, the gearing for operating it, the plow-carrying beams, and the handles, of a coupling-box arranged upon the axle, and the coupling-iron F, embracing and pivoted to said box in front of the axle, having a branch connecting the handles above the axle, a branch connecting the plow-beams below the axle, and a bearing for the hoe-shaft in rear of the axle, whereby both the revolving hoe and the plows are controlled by the handles for both lateral and vertical adjustment directly upon the axle, substantially as set forth.

2. The coupling-box G, mounted loosely upon the axle, in combination with the branched coupling-iron F, the hoe-shaft, the plow-beams, the handles, and the gearing, the said coupling-iron being coupled to the axle-box in front of the axle by a pin, whereby the coupling-iron has a pivotal movement upon the box and the latter a free movement upon the axle.

3. The combination, with the loose axle-box, the branched iron F, coupled to said box in front of the axle, the hoe and plow attachments, and the hoe-operating gearing, of a spring placed upon the axle and having bearing force against the axle-box to maintain the hoe-shaft pinion in gear with the axle-gear and allow of the lateral movements of the hoe and plow attachments.

4. The branched coupling-iron having the draft-clevis attachment, in combination with the loose coupling-box, the axle, the hoe and plow attachments, the hoe-shaft-operating gearing, and the guiding-thills, substantially as described, for the purpose specified.

5. The combination, with the axle B, the hoe-shaft, the plow-beams, and the handles, of a clevis-draft universal-joint coupling, consisting of a coupling-box, G, a coupling-iron, F, and a coupling-pin, $a$, passing through both, the said coupling-iron having a clevis attachment, V, and branches for the plow-beams and the handles, arranged upon and in relation to the axle, substantially as herein set forth.

6. The branched coupling-iron F, formed with a draft-clevis at its front end, the axle-box G, having a front projection, and the pin coupling these parts between the axle and the draft-clevis, combined with the axle-spring, the hoe and plow attachments, the hoe-shaft-operating gear, and the guiding-thills, substantially as described, for the purpose specified.

7. The combination, with the axle, the hoe attachment, its operating-gearing, and the handles, of a universal-joint axle-coupling device, consisting of the box G, the branched iron F, and the pin $a$, and the device for controlling the hoe-shaft pinion, consisting of the lever W, pivoted to the coupling-pin $a$, the spring T, and the arm X, pivoted to said lever and to a fixed axle-collar, the said lever having a pin-connection with the handles, and the said pinion and universal-joint coupling moved bodily to engage or disengage said pinion, substantially as described.

8. The revolving hoe of a cotton-chopper, consisting of a hub having screw-taps, the shouldered screw-spokes, and the hoe-blades $j$, having a bent branch arm, $l$, clamped upon the shouldered spokes by a nut, whereby the hoe-blade proper is free of the spoke-connection, for the purpose stated.

9. The branched coupling-iron F, the axle-box G, and the coupling-pin $a$ for these parts, arranged in front of the axle, in combination with the hoe-shaft, having a bearing in the coupling-iron independent of the joint coupling-pin of the coupling-irons, substantially as described, for the purpose specified.

10. The combination, in a cotton-chopper, of the hoe and plow attachments, and a universal clevis-draft coupling therefor mounted directly upon the axle, with a disengaging device for the hoe-shaft-operating pinion, and the guiding-thills having a fastening-hook, $t$, whereby the hoe-shaft pinion is disengaged from the axle-gear when the plow and hoe attachments are turned up upon the thills when the machine is not in use.

In testimony whereof I have hereunto set my hand in presence of two subscribing witnesses.

GEORGE M. BADGER.

Witnesses:
JOHN TILLMAN,
D. W. ROUNTREE.